Feb. 13, 1973 C. M. LANARO 3,715,951
MUSIC TEACHING AID
Filed June 30, 1971

INVENTOR.
CLARA M. LANARO
BY
PATENT AGENT

United States Patent Office 3,715,951
Patented Feb. 13, 1973

3,715,951
MUSIC TEACHING AID
Clara M. Lanaro, 1002 Pepper Ave.,
Sunnyvale, Calif. 94087
Filed June 30, 1971, Ser. No. 158,392
Int. Cl. G09b 15/00
U.S. Cl. 84—470                                2 Claims

ABSTRACT OF THE DISCLOSURE

A music teaching aid including a plurality of wires supported by a frame in spaced parallelism to simulate the appearance of a musical staff together with note members, clef-identifying members, note-identifying members, measure-indicating members, sharp and flat-indicating members and musical time-indicating members arranged for removable connection to the wire staff members, thus to simulate a musical score.

FIELD OF THE INVENTION

The present invention relates generally to teaching aids, and more particularly, to a teaching aid which will facilitate the learning of the written presentation of music by young children.

BACKGROUND OF THE INVENTION

It is, of course, well known that young children learn readily, but because of their limited experience with the written presentation of words, numbers, or music in the pre-school and beginning school periods, certain teaching aids have been employed. In many instances, these teaching aids take the form of simple games which engage the child's interest, and as a consequence, accelerate the learning process, a simple example being the presentation in pictorial form of a cat on one side of a card and the word "cat" printed on the opposite side thereof. Such games facilitate the intellectual bridging between the representation of concrete objects and the more abstract written symbolism thereof.

SUMMARY OF THE PRESENT INVENTION

It is, accordingly, the general objective of the present invention to provide a music teaching aid in the form of a three-dimensional unit visually similar to the written presentation of a musical score which can be physically manipulated by the music student or teacher in game-like fashion to generate the student's interest and facilitate the music learning process. To achieve this objective, the teaching aid preferably includes a plurality of wires or equivalent members supported by a frame in spaced parallelism so as to visually simulate the lines and spaces of a musical staff as presented in written sheet music. These wires or other staff members are arranged to receive and removably support note members of generally spherical form and, more particularly, simulating the appearance of written note members. Each note member is formed so as to be capable of removable attachment either in a line or space position, and can easily be placed on the wires or other staff members, and after placement thereon can be shifted laterally to desired positions on the staff. The wires or other staff members are also arranged to receive removably other three-dimensional members that simulate the appearance of clef-identifying members, note-identifying members, measure-indicating members, sharp and flat-indicating members, and musical time-indicating members.

These various members can be supplied to the child and a request made, for example, by the teacher that the child place a note at the G position on the treble clef of the staff, first, perhaps, with the treble clef-identifying member and the note-identifying member in position, and later without such indicating members in position. Thus, through the playing of a game, which allows for the child's manipulation of the three-dimensional units, his or her interest is captured and the learning process proceeds rapidly. Because of the visual similarity between the three-dimensional teaching aid hereinafter described in detail and that of the written musical score, it has been found that the learning process is expedited.

BRIEF DESCRIPTION OF THE DRAWING

The stated objective of the invention and the manner in which it is achieved, as summarized hereinabove, will be more readily understood by reference to the following detailed description of an exemplary embodiment of the invention illustrated in the accompanying drawing wherein.

DETAILED DESCRIPTION OF THE EXEMPLARY EMBODIMENT OF THE INVENTION

Figure 1:
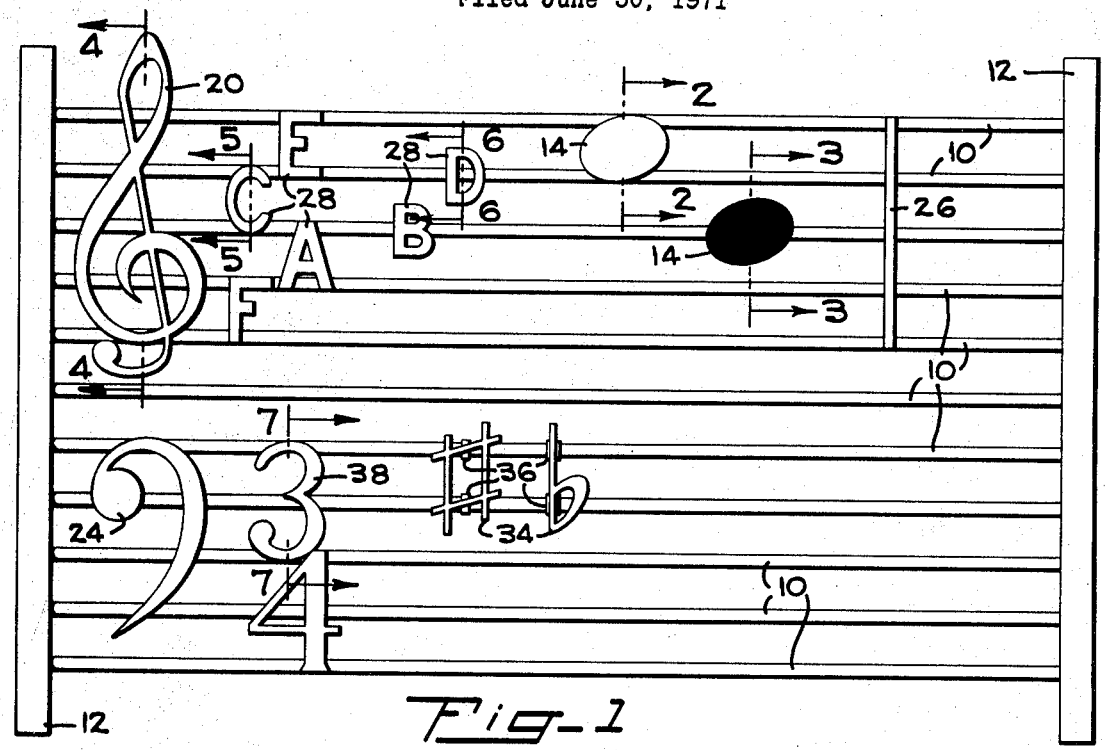
FIG. 1 is a front elevational view of a music teaching aid embodying the present invention, and FIGS. 2 through 7, inclusive, constitute a series of fragmentary cross-sectional views taken along the corresponding lines, as indicated on FIG. 1, to illustrate the various units or members and their manner of attachment to the musical staff.

With initial reference to FIG. 1, the music teaching aid embodying the present invention includes a plurality of metal wires 10 which are secured at their opposite extremities to side members of a generally rectangular frame 12 so as to be supported in spaced parallelism. More particularly, as illustrated, eleven wires 10 are supported by the frame 12, the top five wires forming the lines and spaces of the treble clef, as presented in written music, and the bottom five wires defining the lines and spaces of the base clef of music as generally written. The middle wire, of course, represents middle C intermediate the base and treble clefs, and preferably is colored differently than the other wires so that the visual presentation of written music is accurately simulated. While the wires 10 provide one simple and inexpensive manner of forming the lines and spaces of a musical staff in close simulation to the written presentation of music, it will be apparent that other members such as wooden dowels or other members of various materials can be used to simulate the appearance of the staff members, and these alternatives are, of course, encompassed within the general scope of the invention. It will be appreciated, however, that wires are relatively inexpensive and can readily be mounted to an exterior frame so as to maintain the cost of the teaching aid at a minimum, but by the same token, provide a unit which will be capable of much handling and play-learning activity by the music student.

Figure 2:
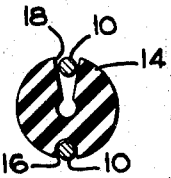
Figure 3:

With continued reference to FIG. 1, and additional reference to FIGS. 2 and 3, generally spherical members 14 simulating the written presentation of musical notes are formed to enable removable attachment to the wires 10 forming the musical staff either on a line or space disposition. The note members 14 are formed from slightly resilient material and have opposing slots 16, 18 therein, one of said slots 16 being rather shallow and slightly larger in cross section than the wires 10 forming the staff member and the other slot 18 being of deeper radial dimension extending substantially to the center of the spherical note member. The latter slot 18 tapers radially inward to a transverse dimension less than the diameter of the wire but then opens slightly to provide a central opening therein which is slightly larger than the wire diameter.

Accordingly, if it is desired that a note member 14 be put on the staff in a space position, the upper and deeper radial slot 18 is first inserted over a wire 10 at the appropriate note level and thence is pivoted inwardly so that the lower and shallower slot 16 is above the next wire thereunder whereupon the unit can be released to assume the connected position illustrated in FIG. 2. On the other hand, if a note member 14 is to be placed in a line position, the note member is pushed over the desired wire 10 representing the specified note, so that such wire fully enters the deeper slot 18 while being pressed through the narrowed portion thereof until the wire is centered in the slightly enlarged central opening at the bottom of such deeper slot. The note member 14 is then released and under gravitational action will assume the disposition shown in FIG. 3. Obviously, for removal of either of the note members, as shown in FIG. 2 or 3, a reversal of the above-described process will take place, and it will be appreciated that either the attachment or detachment of the note members 14 from the staff is simple and can be readily accomplished by a young child. In addition, it will be observed that the note members 14, when secured either in a space or line position on the staff, can be moved laterally along the supporting wires 10 to an appropriate disposition on the staff in such direction. Furthermore, since the note members 14 occupy the same vertical disposition when in a line or space position on the staff members, they can be colored to represent single or two-beat notes.

It will be obvious that other specific formations of the note members 14 can be made providing for a slightly different manner of attachment and detachment to and from the staff members 10, and such alternate manners of attachment are utilized in specific forms for other musical-identifying members, as illustrated in FIGS. 4 through 7, inclusive.

Figure 4:
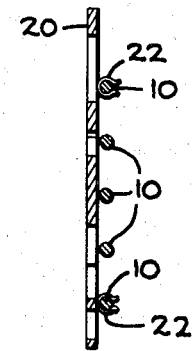

More particularly, with specific reference to FIG. 4, a treble clef-identifying member 20 is shaped and dimensioned for attachment in the proper position, as illustrated in FIG. 1, and as shown in cross-sectional detail in FIG. 4. The main body portion of the treble clef-identifying member 20 can be formed of plastic with integral spring clips 22 formed adjacent its upper and lower extremities and spaced apart a distance equivalent to the upper and lowermost wires 10 of the treble clef. Accordingly, the treble clef member 20 can be readily pushed into the proper position on the wire staff members 10, as illustrated in FIG. 1, but it will also be observed that the treble clef member could be positioned over other sets of wires so that it is incumbent upon the child undergoing the learning process to choose the right position when placing the treble clef member. In turn, the base clef member 24 can be provided with spring clips similar to those attached to the treble clef member in the manner shown in FIG. 4, and can be appropriately applied in the proper disposition, as illustrated in FIG. 1.

A measure-indicating member 26 in the form of an appropriately dimensioned plastic bar can also be provided with spring clips of the type utilized for attachment on the treble and base clef-identifying members 20, 24, and it is to be particularly observed that after placement over the wires 10 of the staff, as shown in FIG. 1, the measure bar 26 can be laterally shifted, if desired, to enable the appropriate number of note members 14 to be placed adjacent the measure depending upon the "time" of the particular musical score.

Figure 5:
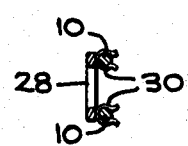
Figure 6:
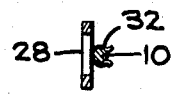

With continued reference to FIG. 1 and additional reference to FIGS. 5 and 6, note-identifying members 28 in the form of plastic letters with small spring clips 30, 32 attached to their rear surfaces are also arranged for removable attachment to the wire staff members 10. More particularly, if the note-identifying member 28 is to be positioned at a space on the staff, two spring clips 30 are arranged adjacent the upper and lower edge thereof with a distance therebetween equivalent to the distance between two wires, as shown in FIG. 5. On the other hand, if the note-identifying member 28 is arranged to identify a space on the staff, a single, central spring clip 32 is positioned on its rear side so that the note-identifying member 28 will be appropriately disposed on the staff, as indicated in FIG. 6.

Sharp and flat-indicating members 34 can also be formed from plastic material with spring clips 36 on the rear surfaces thereof in positions similar to that shown in FIG. 5 or FIG. 6 depending upon whether the sharp or flat is to be attached to a line or space on the staff.

Figure 7:
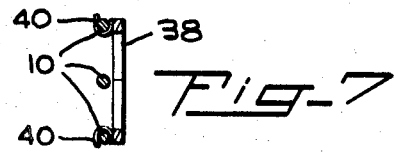

It will be observed that in each of the structures shown in FIGS. 4, 5, and 6, the attachment is made by directly pushing towards the wire staff members 10 and removal, in turn, is achieved by a direct pulling therefrom. However, it will be apparent that other means for connecting the individual identifying or indicating members can be achieved, and one example is illustrated in FIG. 7 indicating the manner of attachment of a musical time-indicating member 38, two of which are shown in FIG. 1 and one of which is illustrated in cross section in FIG. 7 to indicate its manner of connection. More particularly, two spaced spring clips 40 are positioned at the rear surface of the time-indicating member 38 adjacent its upper and lower extremities with a distance therebetween substantially equivalent to the distance between two wire staff members 10. The upper spring clip opens upwardly and the lower spring clip opens downwardly so that for attachment, the time-indicating member 38 is tilted laterally and positioned between the two wires and then is merely turned to bring the opposed clips 40 into wire-encompassing position, as shown in FIG. 7. In turn, a reversal of this process enables detachment.

Yet other musical identifying or indicating members can be similarly employed with appropriate means enabling ready connection or disconnection to and from the staff members, and the foregoing description of one particular embodiment of the invention is accordingly to be considered as purely exemplary and not in a limiting sense; and the actual scope of the invention is to be indicated only by reference to the appended claims.

What is claimed is:

1. A music teaching aid which comprises
   a plurality of spaced parallel members simulating the lines and spaces of a musical staff, and
   a plurality of members simulating musical notes arranged for connection to said staff members,
   each of said note members having a dimension slightly larger than the spacing between adjacent parallel staff members and opposiing slots arranged to encompass adjacent staff members.

2. A music teaching aid according to claim 1 wherein said note members are formed from resilient material and one of said slots tapers radially inward to a cross dimension less than the diameter of said wire staff members and thence outwardly to a central opening slightly larger than the wire diameter.

References Cited

UNITED STATES PATENTS

| | | | |
|---|---|---|---|
| 510,302 | 12/1893 | Thew | 84—472 |
| 3,530,758 | 9/1970 | Stillo | 84—471 |
| 2,082,432 | 6/1937 | Von Der Linden | 84—471 |
| 2,770,160 | 11/1956 | Ulvad | 84—471 X |
| 2,772,595 | 12/1956 | Cutlip | 84—472 |

RICHARD B. WILKINSON, Primary Examiner

JOHN F. GONZALES, Assistant Examiner

U.S. Cl. X.R.

84—472